United States Patent
Lewis et al.

(10) Patent No.: US 7,783,025 B1
(45) Date of Patent: Aug. 24, 2010

(54) METHOD AND APPARATUS FOR REASSIGNMENT OF CLASSIFIER PROBABILITIES BASED ON DYNAMIC EVENTS

(75) Inventors: Steven H. Lewis, Middletown, NJ (US); Kenneth H. Rosen, Middletown, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1394 days.

(21) Appl. No.: 11/215,242

(22) Filed: Aug. 30, 2005

(51) Int. Cl.
 *H04M 7/00* (2006.01)
(52) U.S. Cl. .............. 379/221.05; 379/120; 379/221.06
(58) Field of Classification Search .............. 379/88.18, 379/265.01–265.14, 120, 220.01–221.06
 See application file for complete search history.

(56) References Cited

U.S. PATENT DOCUMENTS

| | | | | |
|---|---|---|---|---|
| 6,016,336 A | * | 1/2000 | Hanson | 379/88.23 |
| 6,487,277 B2 | * | 11/2002 | Beyda et al. | 379/88.01 |
| 6,985,576 B1 | * | 1/2006 | Huck | 379/265.09 |
| 2004/0236620 A1 | * | 11/2004 | Chauhan et al. | 705/9 |

* cited by examiner

*Primary Examiner*—Simon Sing

(57) ABSTRACT

A method and apparatus for reassignment of classifier probabilities based on dynamic events is disclosed. In one embodiment, the present invention provides a method for dynamically detecting change in the rate and type of calls, reassigning the natural language classifier probabilities based on the dynamics of the change and routing calls according to the detected changes. The method enables the user to route calls efficiently and be more responsive to customers.

12 Claims, 4 Drawing Sheets

METHOD AND APPARATUS FOR REASSIGNMENT OF CLASSIFIER PROBABILITIES BASED ON DYNAMIC EVENTS

The present invention relates generally to machine learning for communication networks and, more particularly, to a method and apparatus for reassignment of classifier probabilities to improve the accuracy of routing and be more responsive to customer needs on communication networks, e.g., packet networks such as Voice over Internet Protocol (VoIP) networks.

BACKGROUND OF THE INVENTION

The Internet has emerged as a critical communication infrastructure, carrying traffic for a wide range of important scientific, business and consumer applications. The Internet has become ubiquitous and has enabled businesses to expand globally. For example, customer service organizations are often scattered globally, where these customer service organizations are organized and/or tasked with addressing customer requests that are based on the type of customer requests instead of the customers' physical location. When a customer calls and uses natural language, an automated system makes the determination on which representative or department is best able to respond to the request based on historical probability data and routes the call accordingly.

The automated system uses a call classifier to determine where a particular call should be forwarded. The classifier uses predictions made about the distribution of the calls based on historical data. The predicted probabilities for each category of calls are fed to the classifier and updated occasionally. The classifier is constrained by the probabilities it is provided for each category of calls.

When a dynamic event occurs, the distribution of the type of requests by the callers' changes but the classifier remains constrained by the previous probabilities for each category and results in a decline of the accuracy of the classifier. The calls are increasingly misrouted and require intervention to reach the proper destination, which increases the operating cost for the customer service organizations with a possible corresponding increase in customer dissatisfaction.

For example, when a natural disaster such as a hurricane occurs, the distribution of calls to an insurance company changes. Relative to more stable caller requests, the percentages of calls for new claims, questions on coverage and similar inquiries will likely increase. The classifier probabilities established based on a regular business day are not applicable and more and more of the calls may be misrouted. Hence, the automated system becomes less responsive to the customer's need during a particularly difficult time.

Therefore, a need exists for a method and apparatus for reassignment of classifier probabilities based on dynamic events.

SUMMARY OF THE INVENTION

In one embodiment, a method and apparatus for reassignment of classifier probabilities based on dynamic events is disclosed. The present invention provides a method for dynamically detecting a change in the rate and type of calls, for reassigning the natural language classifier probabilities based on the dynamics of the change and for routing calls according to the detected changes. Thus, the present method enables the automated system to route calls efficiently and to be more responsive to the customers.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for reassignment of classifier probabilities based on dynamic events. Although the present invention is discussed below in the context of classifier probabilities for telecommunications networks, the present invention is not so limited. Namely, the present invention can be applied in the context of classifiers for other applications. For example, epidemiological studies requiring identification of causes would benefit from dynamic reassignment of classifier probabilities to be more response to events such as new flu outbreaks. Furthermore, although the present invention is discussed below in the context of packets, the present invention is not so limited. Namely, the present invention can be applied in the context of records, fields, or any other unit or measure of data. For example, epidemiologists need reported data on outbreaks, misdiagnosis etc. For the purpose of scope, the term packet is intended to broadly include a record or a field.

Figure 1:
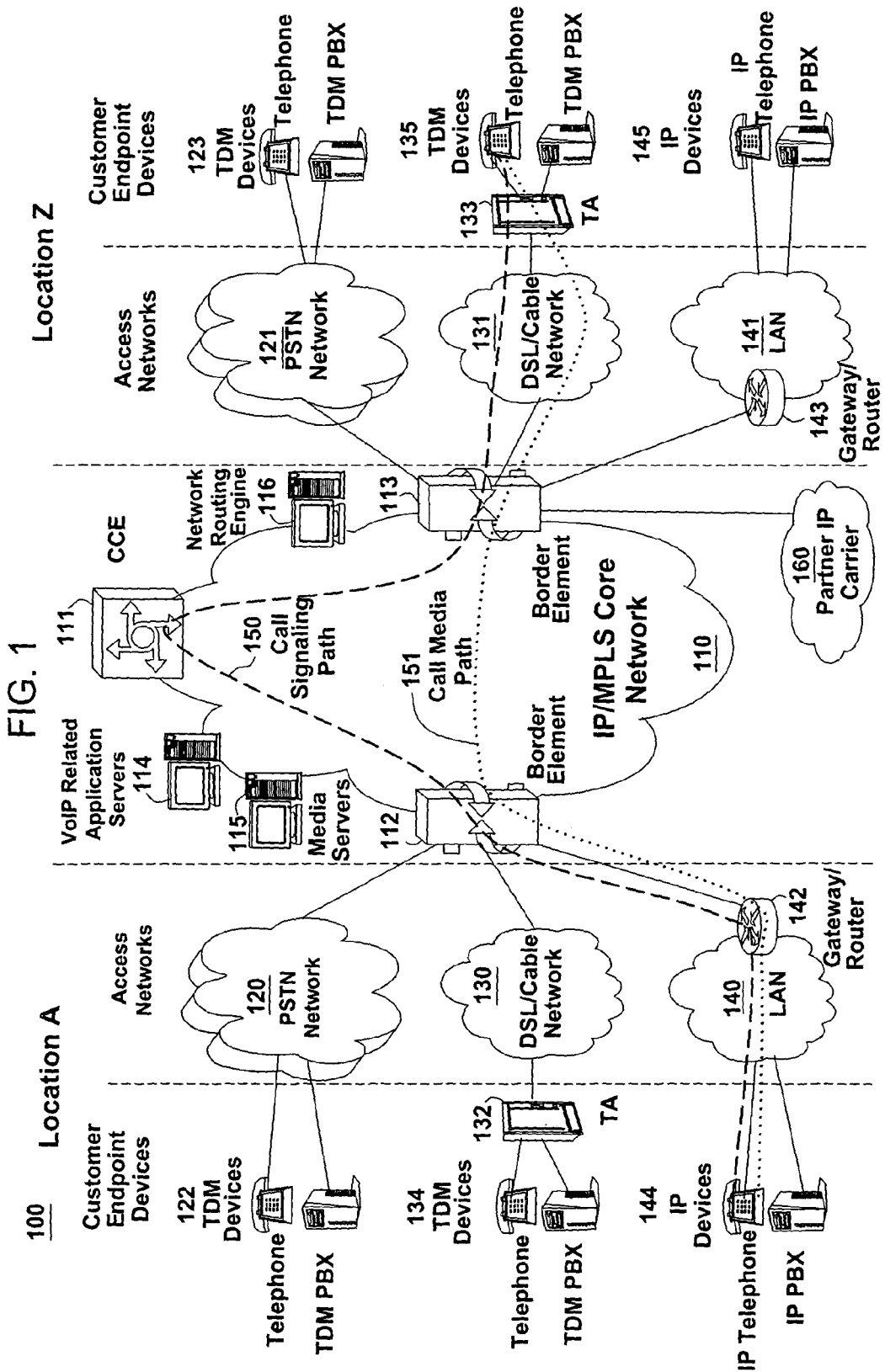
FIG. 1 illustrates an exemplary network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above VoIP network is described to provide an illustrative environment in which a large quantity of calls may traverse throughout the entire network. The calls may originate on TDM or IP platform and the callers may use natural language to interact with the automated system that routes the call to the appropriate destination. For example, a caller may want to reach a customer service representative, to inquire about prices, to request maintenance and so on. The caller interacts with the automated system by speaking normally, e.g., using natural language intended for communicating with humans. In response, the automated system makes a probabilistic determination of the proper destination and routes the call.

If the initial destination is not correct, the call is either forwarded back to the system for more analysis, e.g., presenting questions to the caller, or to a destination for exception handling, e.g., forwarding the call to a customer care agent. For example, if the automated phone system handles emergency calls such as 911, cycling through the automated system multiple times would not be acceptable and the call would instead be forwarded to a person that would interact with the caller.

The classifier probabilities to be used by the automated system are determined from historical data and are provided to the automated system. Since the data is externally provided and not dynamically determined, when dynamic events occur, the system generally continues to be constrained by the previous classifier probabilities and the accuracy may decline. For example, if ninety percent of the calls to an insurance company are regarding existing claims and a natural disaster occurs, the automated system may continue to route ninety percent or nearly ninety percent of the calls to the destination handling existing claims. Hence, the recipient of the call from the automated system has to interact with the caller, determines that the call was routed inaccurately and then manually forwards the call to the proper destination. This inefficiency is costly in terms of time and resources and fails to be responsive to customer needs.

The present invention provides an efficient method and apparatus for reassignment of classifier probabilities based on dynamic events. In one embodiment, the present invention provides a method for dynamically detecting a change in the rate and type of calls, reassigning the natural language classifier probabilities based on the dynamics of the change and routing calls according to the detected changes. The present method enables the user to route calls efficiently and to be more responsive to customers.

Figure 2:
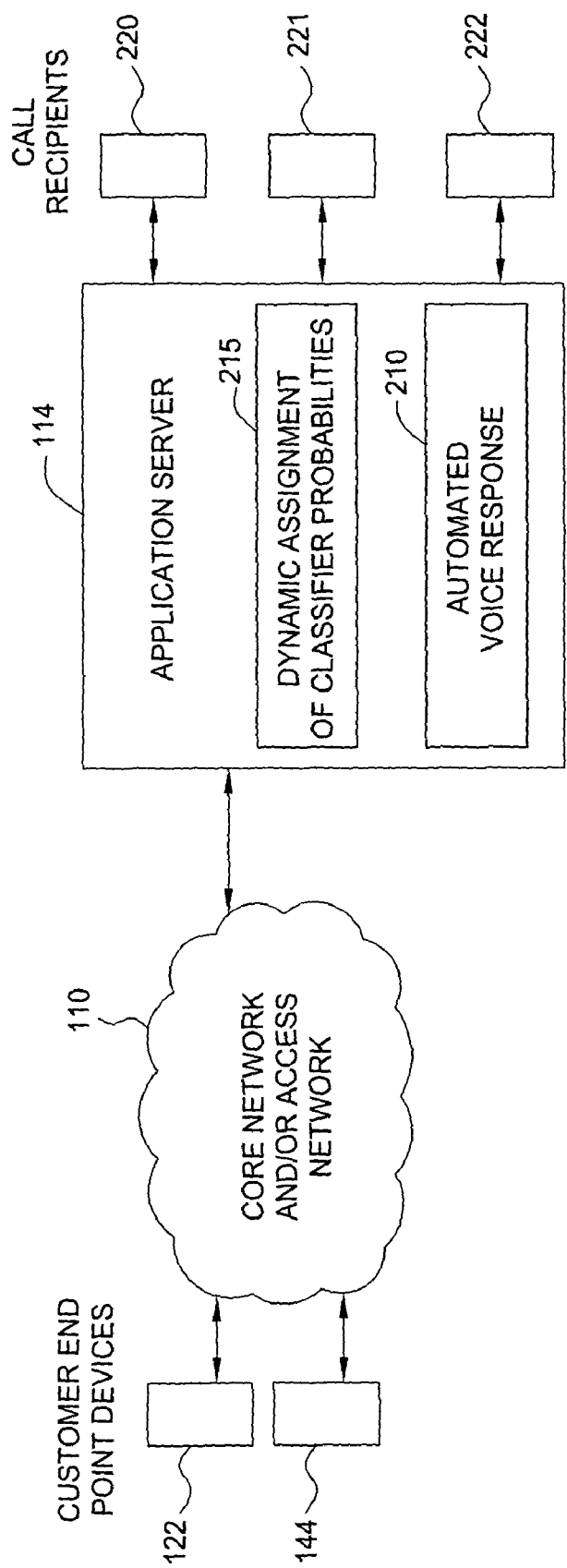
FIG. 2 illustrates an application server with the functionality for dynamic reassignment of classifier probabilities and automated voice response system.

FIG. 2 illustrates an application server 114 with an automated voice response functionality or module 210 and a functionality or module for dynamic reassignment of call classifier probabilities 215.

In one embodiment, the classifier probabilities are determined and updated automatically based on call data. For example, if a natural disaster occurs, the changes in the pattern of calls to an insurance company are detected automatically. The classifier probabilities are modified to address the new dynamics. Note that the present invention can also be used in conjunction with an external feed of updated classifier probabilities. For example, a manual interface can be used to update the classifier probabilities after an earthquake is detected in an area. The level of automation depends on the needs of the business and the criticality of the call.

In one embodiment, the customers initiate the calls using end point devices 122 and 144 over the core network and/or an access network 110. The application server 114 interacts with the callers to determine the most likely intended recipient of the call based on the response and the classifier probabilities. The relevant recipients 220, 221 and 222 will then receive the calls forwarded by the application server 114. It should be noted that the application server 114 can be deployed external or internal to the core network 110.

If the call is routed to an unintended recipient, it can either get forwarded to the correct destination by the unintended recipient or sent back to the application server 114. The present invention provides both implementations.

The reassignment of classifier probabilities in response to dynamic events, removes constrains on the automated system to continue routing according to the outdated classifier probabilities and makes the automated system more responsive to the customer needs. The present invention improves the efficiency of the automated system and eliminates or significantly reduces the time and cost associated with handling misrouted calls.

Figure 3:
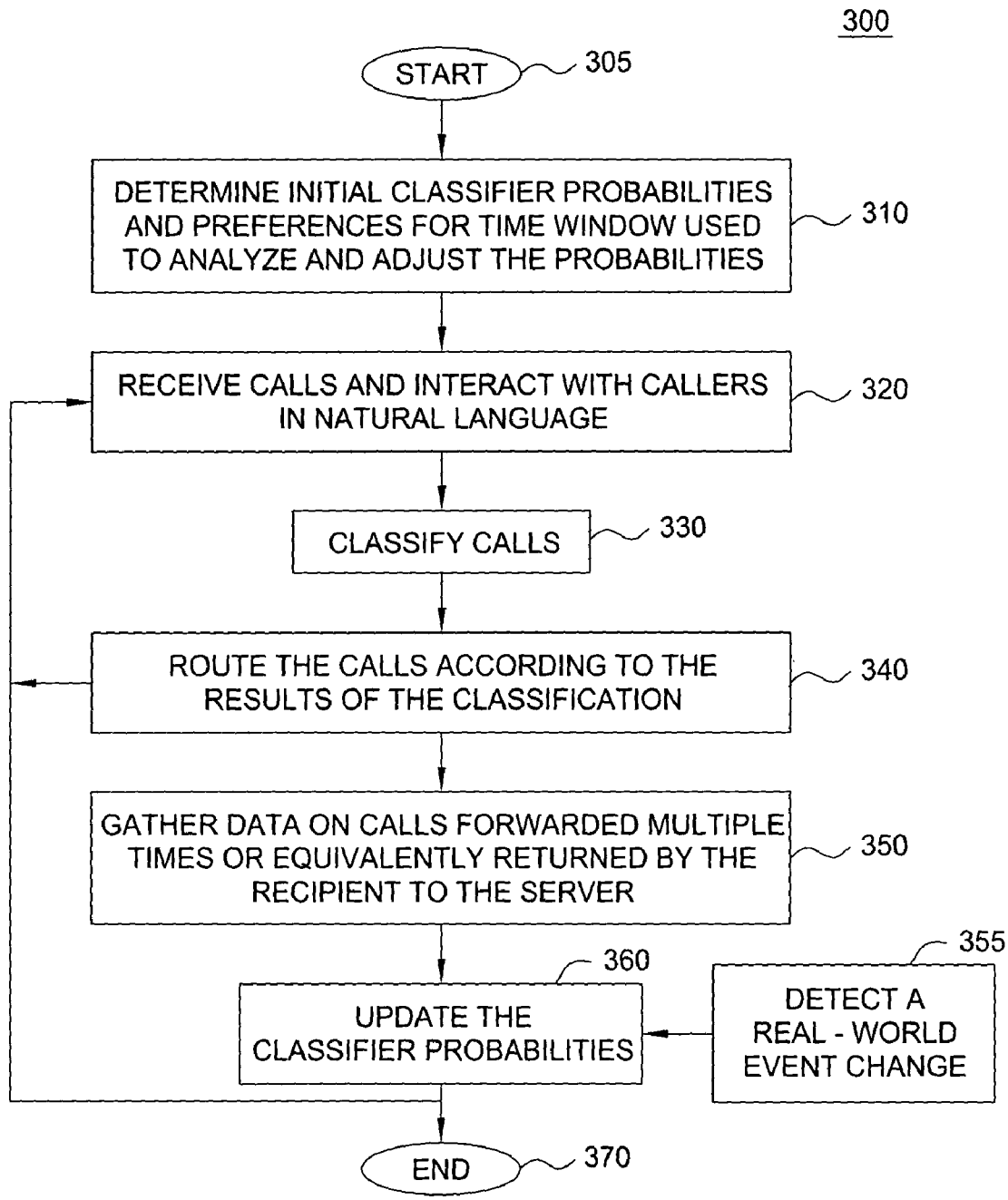
FIG. 3 illustrates a flowchart of a method for reassignment of classifier probabilities based on dynamic events.

FIG. 3 illustrates a flowchart of a method 300 for reassigning call classification in the event of a dynamic event. Method 300 starts in step 305 and proceeds to step 310.

In step 310, method 300 determines or selects initial classifier probabilities based on historical data and determines the time window for adjusting the classifier probabilities. The initial data can be fed to the application server manually or automatically. The application and implementation determine the appropriate time window for establishing a change in classifier probabilities, e.g., in terms of months, weeks, day of the week, time of day and so on. For example, call statistics may have patterns that are associated with a seasonal period, day of the week and so on. The implementation and application determine whether the short-term fluctuations should affect the classifier probabilities or not. Therefore, some applications may need the classifier probabilities to be adjusted in real time and others may need a change in days, months, etc. The application server determines the appropriate time window for data collection and for adjusting the classifier probabilities in step 310. The method then proceeds to step 320.

In step 320, method 300 receives calls and interacts with the callers using natural language. The application server has automated voice response functionality to determine or parse the natural language inputs into recognized terms, thereby allowing the automated system to determine what the caller is attempting to obtain. Such natural language voice recognition systems with classifier probabilities are well known in the art (see, for example, A. Gorin, B. Parker, R. Sachs, & J. Wilpon "How May I Help You?" In Proceedings of Interactive Voice Technology for Telecommunications Applications, 1996 (Basking Ridge, N.J.: September 30-October 1) IEEE, Piscataway, N.J., pp 57-60).

In step 330, method 300 classifies the call based on the classifier probabilities and the data gathered from the caller in step 320. If the classifier probabilities are not adjusted often enough for the dynamics of the business, the classifier efficiency declines. Thus, care must be taken to make sure the time windows for updating the classifier probabilities are appropriate for the application.

In step 340, method 300 routes the call to the recipient as determines by the classification in step 330. If the classifier probabilities are not performing efficiently, calls may be routed to unintended recipients. The unintended recipient can either forward the call to the correct destination or back to the application server for rerouting. For example, in time critical applications such as emergency services, rerouting back to the application server may not be appropriate, where additional questions can be presented to the caller to further refine and assist in the routing function of the automated system. The method then returns to step 320 to continue receiving calls.

In step 350, method 300 also continuously gathers data on calls forwarded multiple times, e.g., a possible indication that these calls were improperly routed, where the unintended recipient directly routes the call to the appropriate destination. The application server may track this information for updating the classifier probabilities. For example, if the percentage of rerouted calls reaches a predefined threshold, e.g., 30% of the calls in a given time period, then the automated system may trigger a update function for updating classifier probabilities or loading new classifier probabilities. The specific value of the threshold is application specific. Namely, 30% may be an acceptable threshold level for one application, but may be too high for another application. The present invention is not limited by the selection of any particular threshold value.

In step 360, method 300 updates the classifier probabilities according to the time window preferences as determined in step 310. Alternatively, the classifier probabilities are updated when the data gathered in step 350 indicates that the selected classifier probabilities are becoming inaccurate, i.e., causing misrouting of calls that are above an acceptable threshold level. Alternatively, the classifier probabilities are updated when a dynamic or real-world event change has been detected in step 355. For example, a dynamic or real-world event may comprise but not limited to, an environmental or weather event (e.g., a hurricane, a tornado, a flood, a tsunami, an earthquake, a fire, and the like), a financial event (e.g., a stock market crash or surge, merger of two large business entities, filing of bankruptcy by a business entity and the like), an emergency event (e.g., an outbreak of a contagious disease, a terrorist act, an outbreak of a military conflict and the like) and so on. The detection of such dynamic or real-world events can be used to immediately trigger a function to update the classifier probabilities. The updated classifier probabilities can be generated from recent calls received within a predefined period of time surrounding (e.g., a time period before and after the event) and/or subsequent (e.g., a time period after the event) to the detection of the dynamic event, e.g., calls received within the last 48 hours, the last 24 hours, and so on. Alternatively, the updated classifier probabilities can be received and loaded into the automated system. For example, an insurance company may have stored classifier probabilities that were previously generated in response to a hurricane event, a flood event and so on. Thus, the automated system can simply retrieve these stored classifier probabilities and immediately implement them when it is informed externally by step 355 (e.g., a manual input sent by a system operator or manager) or internally by step 350 that a corresponding real-world event has just occurred. The ability to adapt the automated system with the proper classifier probabilities in response to real-world events will significantly increase the accuracy of the automated system, thereby leading to greater customer satisfaction.

The method 300 then proceeds to step 370 to end the process. Alternatively, method 300 may proceed to step 320 to continue receiving calls.

Figure 4:
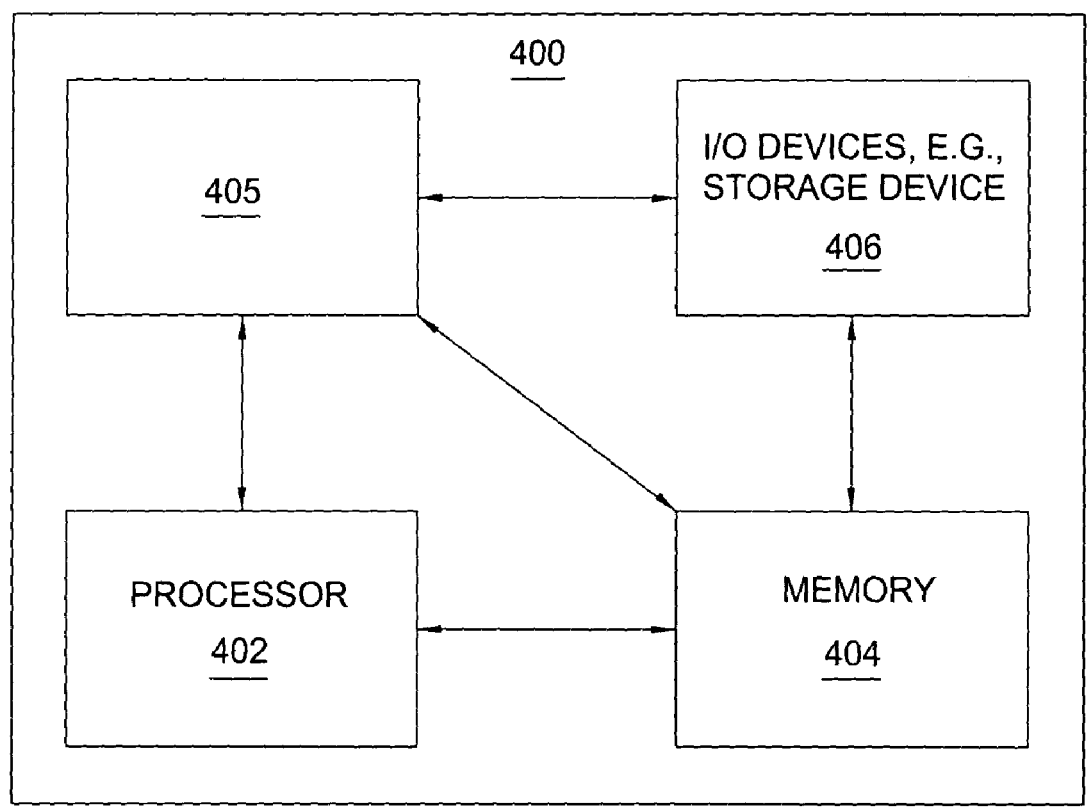
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for reassignment of classifier probabilities based on dynamic events, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general-purpose computer or any other hardware equivalents. In one embodiment, the present module for reassignment of classifier probabilities based on dynamic events or process 405 can be loaded into memory 404 and executed by processor 402 to implement the functions as discussed above. As such, the present method 405 for reassignment of classifier probabilities based on dynamic events (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for updating at least one classifier probability in a communication network, comprising:

detecting a dynamic event, wherein said dynamic event comprises at least one of: an environmental event, a financial event, or an emergency event, wherein said detecting said dynamic event comprises evaluating data pertaining to misrouted calls having exceeded a predefined threshold that is representative of said dynamic event having occurred; and updating said at least one classifier probability in response to said dynamic event, where said at least one classifier probability is employed by an automated system for processing natural language input for routing a call, wherein at least one of: said detecting or said updating is performed by a processor.

2. The method of claim 1, wherein said communication network is a Voice over Internet Protocol (VoIP) network or a Service over Internet Protocol (SoIP) network.

3. The method of claim 1, wherein said updating said at least one classifier probability comprises:

retrieving at least one stored classifier probability that correlates to said dynamic event.

4. The method of claim 1, wherein said updating said at least one classifier probability comprises:

updating said at least one classifier probability using data that has been collected in a predefined time period that is surrounding or subsequent to said dynamic event.

5. A computer-readable medium having stored thereon a plurality of instructions, the plurality of instructions including instructions which, when executed by a processor, cause the processor to perform the steps of a method for updating at least one classifier probability in a communication network, comprising:

detecting a dynamic event, wherein said dynamic event comprises at least one of: an environmental event, a financial event, or an emergency event, wherein said detecting said dynamic event comprises evaluating data pertaining to misrouted calls having exceeded a predefined threshold that is representative of said dynamic event having occurred; and updating said at least one classifier probability in response to said dynamic event, where said at least one classifier probability is employed by an automated system for routing a call.

6. The computer-readable medium of claim 5, wherein said communication network is a Voice over Internet Protocol (VoIP) network or a Service over Internet Protocol (SoIP) network.

7. The computer-readable medium of claim 5, wherein said updating said at least one classifier probability comprises:

retrieving at least one stored classifier probability that correlates to said dynamic event.

8. The computer-readable medium of claim 5, wherein said updating said at least one classifier probability comprises:

updating said at least one classifier probability using data that has been collected in a predefined time period that is surrounding or subsequent to said dynamic event.

9. An apparatus for updating at least one classifier probability in a communication network, comprising:

means for detecting a dynamic event, wherein said dynamic event comprises at least one of: an environmental event, a financial event, or an emergency event, wherein said means for detecting said dynamic event evaluates data pertaining to misrouted calls having exceeded a predefined threshold that is representative of said dynamic event having occurred; and means for updating said at least one classifier probability in response to said dynamic event, where said at least one classifier probability is employed by an automated system for routing a call.

10. The apparatus of claim 9, wherein said communication network is a Voice over Internet Protocol (VoIP) network or a Service over Internet Protocol (SoIP) network.

11. The apparatus of claim 9, wherein said means for updating said at least one classifier probability retrieves at least one stored classifier probability that correlates to said dynamic event.

12. The apparatus of claim 9, wherein said means for updating said at least one classifier probability updates said at least one classifier probability using data that has been collected in a predefined time period that is surrounding or subsequent to said dynamic event.

* * * * *